Figure 1:
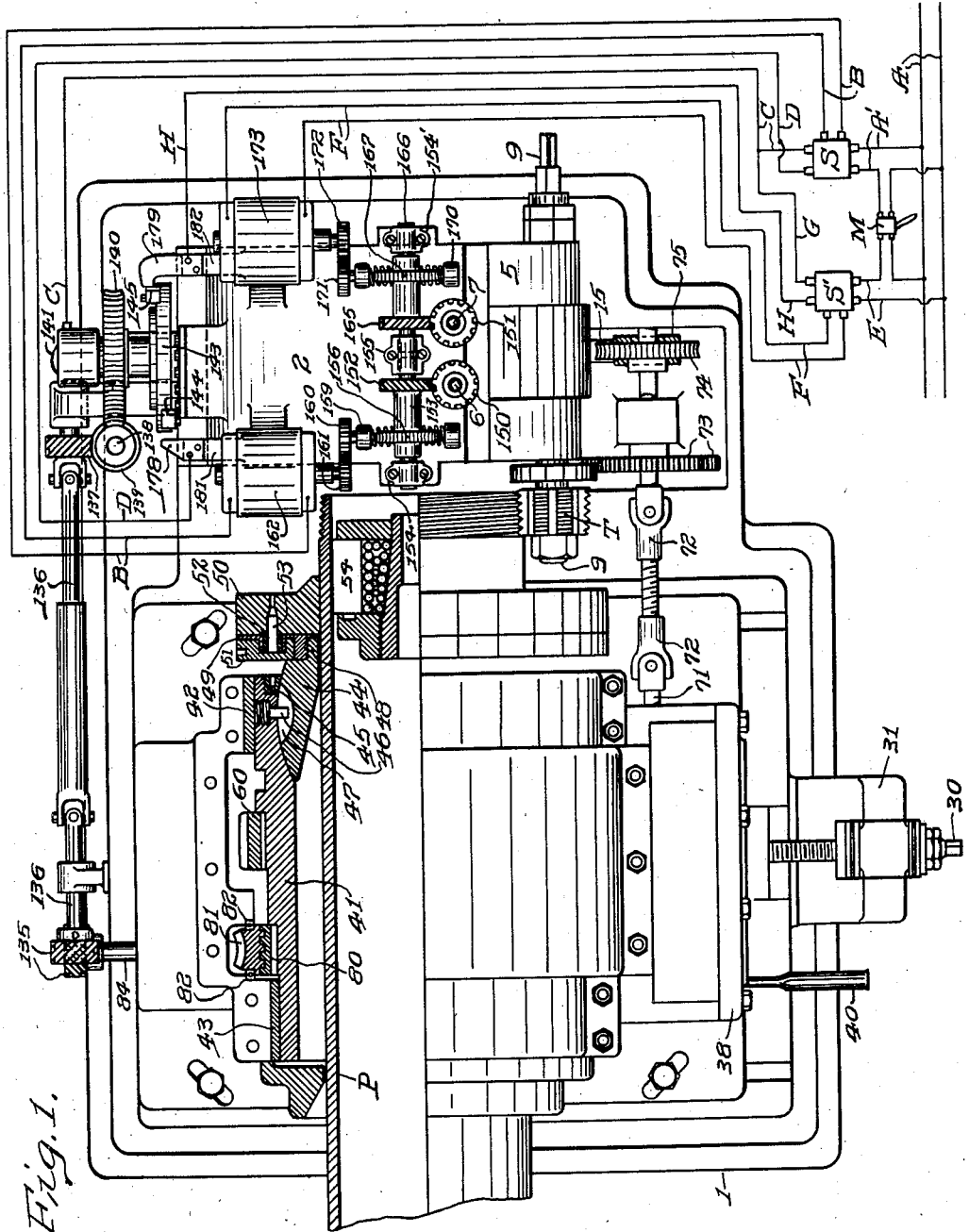

Jan. 28, 1930.  G. E. MIRFIELD  1,745,034
MACHINE FOR MILLING THREADS
Filed Nov. 29, 1926   5 Sheets-Sheet 2
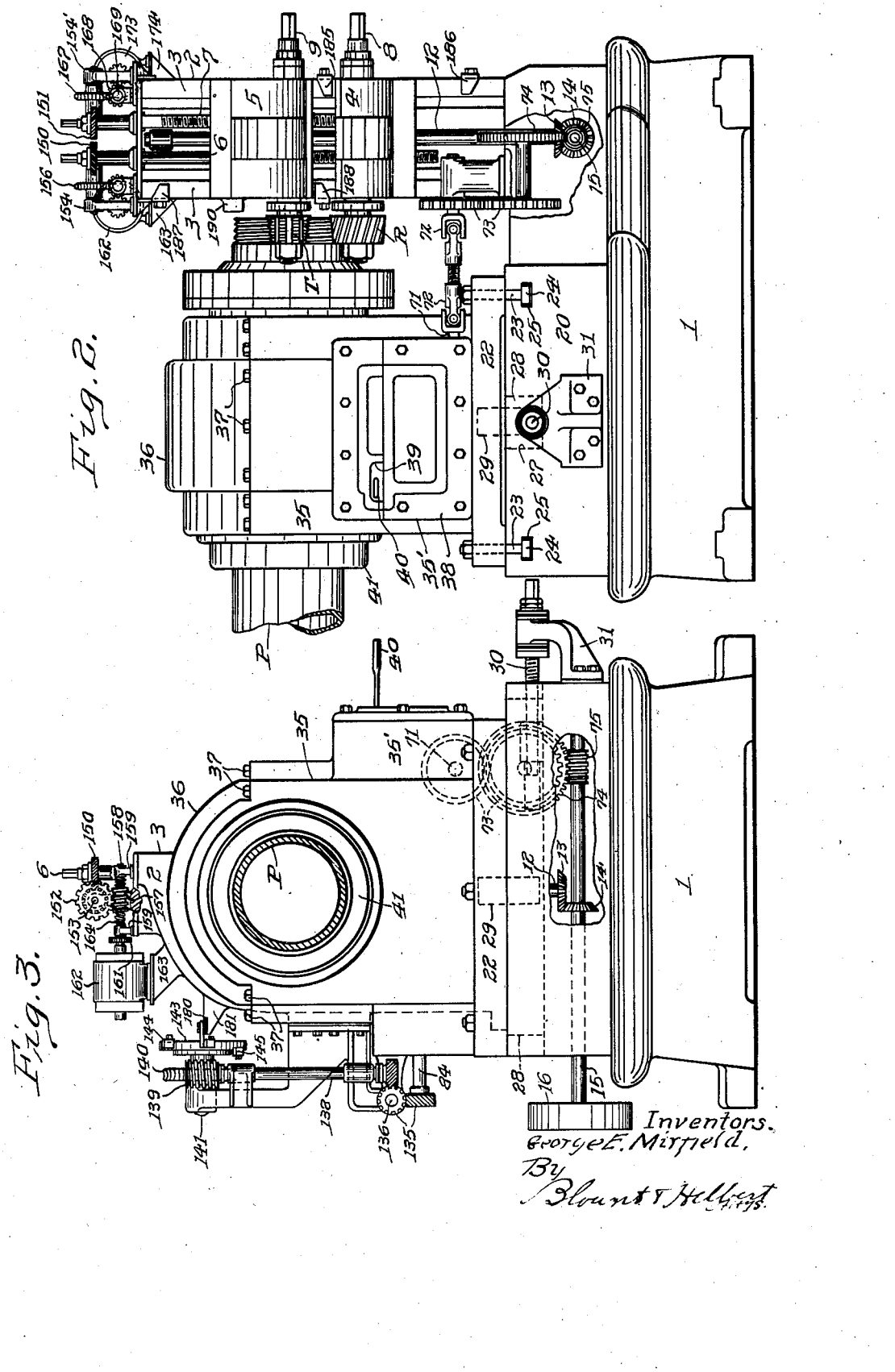
Inventors.
George E. Mirfield,
By
Blount & Hilbert Jan. 28, 1930. G. E. MIRFIELD 1,745,034
MACHINE FOR MILLING THREADS
Filed Nov. 29, 1926 5 Sheets-Sheet 3
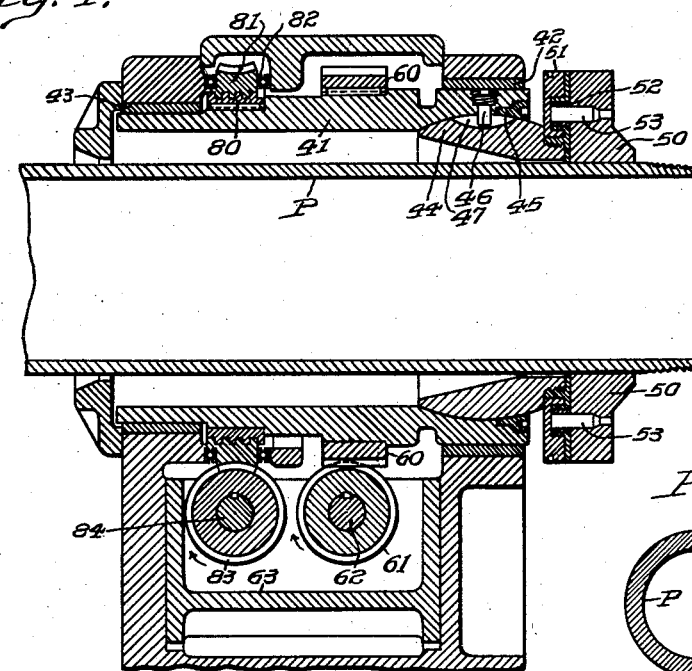
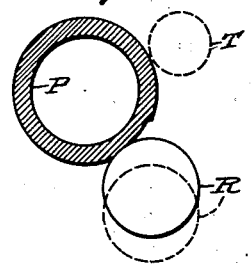
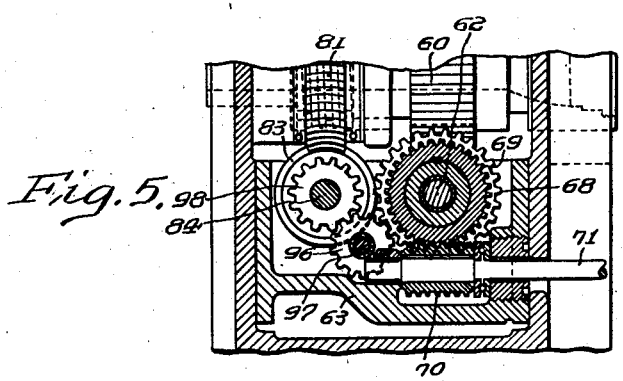
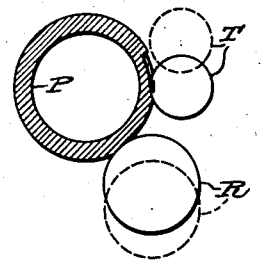
INVENTOR
George E. Mirfield.
BY
ATTORNEYS Jan. 28, 1930.  G. E. MIRFIELD  1,745,034
MACHINE FOR MILLING THREADS
Filed Nov. 29, 1926  5 Sheets-Sheet 4

INVENTOR
George E. Mirfield.
BY
ATTORNEYS

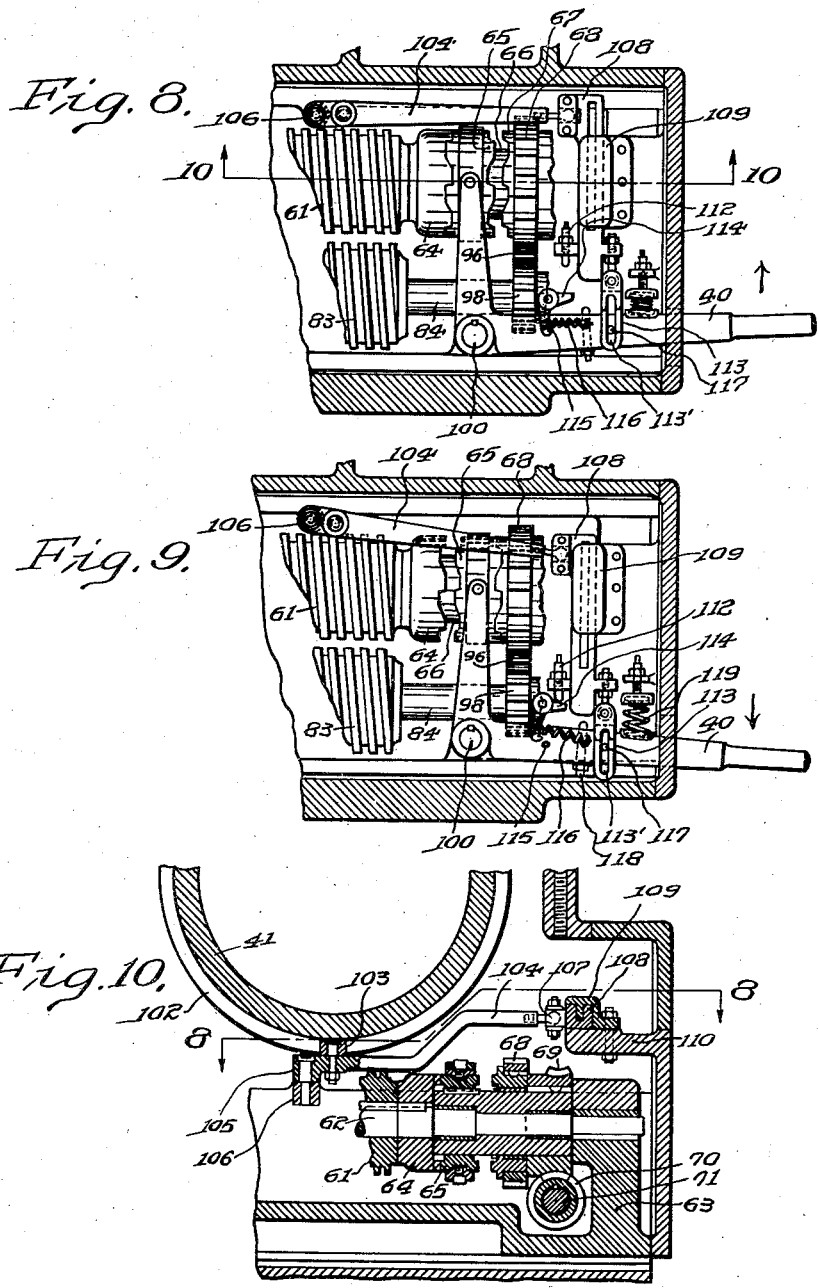

Patented Jan. 28, 1930

1,745,034

UNITED STATES PATENT OFFICE

GEORGE E. MIRFIELD, OF YOUNGSTOWN, OHIO

MACHINE FOR MILLING THREADS

Application filed November 29, 1926. Serial No. 151,281.

Machines constructed in accordance with my invention are particularly adapted for forming threads on the ends of pipes and tubes and I will more especially refer herein to their employment for that purpose, it being, however, understood that such machines are capable of being utilized for other purposes as well, such as the forming of threads on the ends of rods or other work of like character.

In U. S. Letters Patent No. 1,611,122, granted to me December 14, 1926, I disclosed and claimed a novel method for milling threads on pipes, tubes and the like as well as one form of machine adapted for the performance of the said method; the present invention contemplates the provision of another form of machine operable in accordance with said method in its broader aspects and adapted for the production of smooth and accurate threads, either straight or tapered, with a minimum expenditure of time and labor and within the tolerances and of the standard required in modern machine shop practice. Further objects, features and characteristics comprehended by the present invention will hereinafter more fully appear.

In accordance with the present invention and as in the machine disclosed in my aforesaid patent, I employ a plurality, conveniently a pair, of rotatable milling cutters respectively of suitable characters to impart to the work a roughing cut of sufficient depth to remove the scale and true the surface which is to be threaded and to form the desired threads thereon, and so arrange these cutters in their relation to each other and to the work that the roughing cutter will operate on the rotating work at a point in advance of that at which the threading cutter operates thereon with the result that the threading cutter is relieved from the duties of penetrating the scale and truing the work and relegated to the sole duty of cutting into the clean metal exposed by the roughing cut for a depth sufficient to form the required threads, thereby contributing to their accuracy and materially enhancing the life of the cutter.

Moreover, for the production of tapered threads I preferably utilize cutters tapered longitudinally with respect to their axes of rotation in conformity with the taper of the thread which it is desired to produce and of substantially the length of such thread, and provide the threading cutter with a plurality of annular teeth having the profile of the form of the desired thread but no pitch, so that by effecting substantially a single revolution of the work with respect to this cutter while rotating on is own axis and simultaneously moving the work longitudinally for a distance substantially equal to the pitch of the thread to be cut while effecting slight relative movement between the work and the cutter in a direction substantially normal to the axis of the latter, a complete and accurate tapered spiral thread of the desired length will be formed in the work.

For effecting these results I therefore provide a machine in certain respects constituting an improvement upon the machine disclosed in my said patent, which, in its preferred embodiment, comprises, among other things, means for chucking and centering the work and for imparting rotation thereto; separate roughing and threading cutters and means for supporting and driving both cutters in a manner to avoid disalignment or looseness thereof with consequent chattering and resulting imperfection in the work; means for feeding the roughing cutter to depth in the work; means for feeding the threading cutter into the work after the roughing cutter has traversed a limited portion thereof and rendered it suitable for the reception of the threading cutter; means for effecting the requisite relative longitudinal movement between the work and the threading cutter necessary for the production of a continuous spiral thread when employing a cutter having form teeth without pitch; means for effecting gradual relative movement between the threading cutter and the work in a direction substantially normal to the longitudinal axis of the latter to thereby enable the production of accurate tapered threads by adequately compensating for the difference in radial magnitude of different portions of the complete thread, and means for effecting the return of certain of the parts to initial or starting position following the completion of the threading of one piece of work to thereby place the machine in condition for reception of the following piece.

To enable those skilled in the art to comprehend and practise the invention, I have illustrated in the accompanying drawings and will now proceed to describe one form of machine constructed in conformity with the principles thereof, it being, however, distinctly understood that means and instrumentalities other than those to which reference will be made may be utilized if desired without departing from the spirit and scope of the invention; I therefore do not in any way confine or limit myself in the practice of the invention to the employment of the specific features of design, construction and arrangement of the various elements of the particular machine herein disclosed.

Referring now to the drawings, Fig. 1 is a top plan view, with certain parts shown in horizontal section of the organized machine with a piece of pipe disposed therein as it appears after the threads have been cut thereon; Fig. 2 is a side elevation of the machine shown in Fig. 1 but on a smaller scale, and Fig. 3 a rear end elevation thereof, certain parts being broken away to better illustrate interior construction. Fig. 4 is an enlarged vertical longitudinal section through a portion of the mechanism which is supported on the table of the machine and which may, for convenience, be termed the "fixture", a piece of pipe being shown in position therein, and Fig. 5 is a fragmentary vertical section through the base of the fixture on line 5—5 in Fig. 6 which is a staggered horizontal section on line 6—6 in Fig. 7 looking in the direction of the arrows, certain parts, however, being omitted for the sake of clearness, while Fig. 7 is a vertical section in the plane of line 7—7 in Fig. 6 also looking in the direction of the arrows, the pipe P shown in Fig. 4 being omitted. Fig. 8 is a fragmentary view in staggered horizontal section on line 8—8 in Fig. 10 showing certain of the parts shown in Fig. 6 with other parts which are omitted from said figure for the sake of clearness and which particularly relate to the mechanism for controlling the operating lever of the machine; Fig. 9 is a view similar to Fig. 8 but showing certain of the parts in a different position and Fig. 10 is a fragmentary vertical section on line 10—10 in Fig. 8. Figs. 11 and 12 are respectively diagrammatic views illustrating the relative position of the cutters and the work at various times in the cycle of operations incident to the forming of a thread upon the latter. The same symbols are used to designate the same parts in the different figures.

As shown, the machine comprises the usual base 1 which is operative to support the fixture and also a vertically extending pillar 2 arranged near one end of the base and provided on one face with ways 3 upon which are slidably mounted heads 4 and 5, vertical adjustment of which may be respectively effected by adjusting screws 6 and 7. The head 4 is operative to support the horizontally extending roughing cutter spindle 8 and the head 5 to similarly support the horizontally extending threading cutter spindle 9. These two spindles are respectively driven by worm gears meshing with worms disposed on a vertically extending drive shaft 12 within the body of the pillar, the worms being slidably arranged on the shaft so that they will move thereon when the heads are raised or lowered and thus effect the drive of the cutter shafts whatever may be the adjusted positions of the heads. It will of course be understood that the pillar is cut away between the ways so as to expose the worms for engagement by the worm gears while the heads are also cut away centrally adjacent the gears which are held from longitudinal movement on their respective shafts in any suitable way. The worm shaft itself may be driven by suitable bevel gears 13 and 14 mounted respectively on the lower end of the shaft and on the main drive shaft 15 extending horizontally in the base of the machine and driven through a pulley 16, motor drive or other suitable source of power. The several parts to which reference has hitherto been made are closely analogous in form, construction and arrangement to the parts intended for the performance of substantially corresponding functions in ordinary vertical pillar, two spindle milling machines; hence further or more detailed description or illustration of them would be superfluous, particularly as their specific design and arrangement are capable of considerable variation.

It will of course be understood that means are also provided for starting and stopping the machine by applying or cutting off power from the shaft 15 as desired.

The fixture proper is supported on the surbase 20 which is disposed on or forms a part of the base 1 at the opposite end thereof from the pillar and comprises a base 22 adapted to rest on the surbase 20 and be secured thereto by bolts 23 whose heads 24 slidably engage in undercut slots 25 extending transversely of the surbase, thus enabling the fixture to be moved transversely thereof when the bolts are loosened and thereafter secured in any desired position of adjustment by tightening up on the bolts. As it is desirable, as hereinafter more fully described, to afford capacity for limited rotative adjustment of the fixture relatively to the surbase 20, I prefer to form the slots 25 in the base of the fixture with their walls conforming to arcs struck from a point at the center of the fixture and to so arrange the mechanism for traversing the fixture transversely of the surbase that, irrespective of the position to which the fixture may be moved thereon, it may be turned about said central point in either direction through an arc whose length is determined by the length of the slots. To this end I may therefore form in the surbase 20 a relatively wide and deep transversely extending slot 27 and dispose therein a bar or block 28 whose upper face is flush with the surface of the surbase. Near its middle this bar is provided with a heavy vertically extending pin 29 which projects above the surface of the bar and surbase and extends into a cylindrical socket in the base of the fixture, thus forming a pivot about which the fixture may be rotated. The end of the bar adjacent the front of the machine is bored and threaded for the reception of the traversing screw 30 which is rotatably supported in a bracket 31 bolted to the surbase so that by rotating the screw the fixture may be moved transversely. The foregoing forms a convenient manner of providing for rotative adjustment of the fixture on the surbase and for traversing it thereacross but any other means suitable therefor may be utilized if desired.

The fixture comprises a hollow housing 35 adapted to support a substantially semi-cylindrical hollow cap 36 which is secured in place by bolts 37. Toward the front of the machine the base of the housing is extended to form a box-like casing 35' adapted to contain certain of the operating mechanism and closed on its front side by a removable cover plate 38 which is horizontally slotted as at 39 for the passage of the operating lever 40. Within the housing and extending horizontally therethrough is rotatably supported a hollow substantially cylindrical element 41 which I term the container and through which the pipe P extends when in operative position in the machine. The container is journaled in suitable bearings 42, 43 in the housing and at its forward end, that is, the end most nearly adjacent the pillar 2, may be cupped out to a generally spherical contour to receive the centering ring 44 whose exterior surface is of generally spherical form and which is held in position in the container by a collar 45 screwed into the end thereof, the arrangement being such that the centering ring is very snugly seated in the end of the container but capable of limited universal movement with respect thereto. To constrain the ring to rotate with the container a stud 46 is extended through the wall of the container to project into a slot 47 formed in the ring.

The ring is operative to support the chuck by means of which the pipe or other work is operatively secured in the machine and for this purpose the ring may be provided with a forwardly projecting exteriorly threaded nose 48 on which is removably mounted a plate 49 forming the base of the chuck which may be of any suitable construction, that shown comprising a plurality of radially movable jaws 50 which slide in grooves in the plate and are moved in and out by rotation of a grooved cam ring 51 provided with spanner holes for the introduction of a suitable tool to obtain the desired leverage for rotating it and cooperative with rollers 52 mounted on pins 53 secured to the jaws in such manner that when the ring is turned in one direction the jaws will be forced inward to grip the work and when moved in the other direction to be withdrawn therefrom so as to free the work and permit its removal from the machine. Chucks of this general character are of well known construction and in common use.

To afford interior support to the wall of the pipe or other work when the same is hollow and to prevent its being crushed or distorted by the jaws of the chuck, I prefer to place in the interior of the pipe in the vicinity of the jaws an expandible member operative to exert uniform outward pressure on the wall of the pipe irrespective of any irregularities in its interor. For this purpose I prefer to employ a device of the character of that patented to me in U. S. Letters Patent No. 1,548,730 granted August 4, 1925, and in Fig. 1 I have shown a portion of a device of that character disposed in the end of the pipe and acting to support the wall of the same against the inward pressure of the chuck jaws and the strains and stresses set up by the cutters when acting on the pipe during the formation of the threads. As this device is fully disclosed and claimed in my said patent specific description thereof herein is unnecessary other than to say that the device comprises a plurality of independently radially movable blades 54 and means for forcing them outwardly into contact with the wall of the pipe with equal pressure.

It will thus be understood that when positioning the pipe in the machine preparatory to its being threaded the interior supporting device is first placed in the end of the pipe so as to support the wall thereof and the end of the pipe then pushed through the container, centering ring and chuck in the direction of the pillar for a suitable distance to expose the end which is to be threaded; the pipe is then clamped firmly by the chuck so as to turn therewith and, in turn, with the container, the opposite end of the pipe being supported in any suitable manner to permit the requisite rotation of the pipe.

*Container driving mechanism*

Rotation of the container within the housing is effected through the medium of a worm gear 60 which is splined to the container so as to turn therewith though permitting longitudinal movement of the container with respect thereto, and this worm gear is in constant meshing engagement with a worm 61 mounted on the container drive shaft 62 which is journaled for rotation beneath the container and extends transversely of the fixture, that is, at right angles to the axis of the container. For convenience of manufacture and assembly this shaft, together with the master nut driving shaft and other parts to be presently described, may be mounted in a suitable frame 63 so formed and of such shape that after the shafts and other parts are assembled in it the frame may be slid into the lower part of the housing through the opening in the front thereof which is thereafter closed by the plate 38. This materially enhances convenience of manufacture as it enables the necessary machine work and assembly to be done much more readily than would be the case if the frame were not employed and the shafts were journaled directly in the housing.

The worm 61 is keyed to the shaft 62 so as to always turn therewith and is provided with an integral clutch-half 64 adapted for engagement by a double faced clutch member 65 slidably mounted on a sleeve 66 rotatably disposed on the shaft. This sleeve also carries a clutch-half 67 adapted for engagement by the opposite face of the double faced clutch member; this clutch-half 67 is rotatable on the sleeve and to it is keyed a gear 68 so that the gear and clutch-half turn as a unit. Adjacent gear 68 a worm drive gear 69 is keyed on the sleeve, this gear being cooperative with a worm 70 disposed below shaft 62 upon the end of a power shaft 71 which extends through the wall of the fixture and is connected with the main drive shaft 15 through the medium of universal joints 72, gear train 73, worm gear 74 and worm 75 in such manner that, irrespective of the adjusted position of the fixture on the surbase, shaft 71 will be constantly driven from the main drive of the machine. It will thus be apparent that when the lever 40 is operated so as to engage double faced clutch member 65 with the clutch-half 64, the rotation of worm 61 and worm gear 60 and, in turn, container 41, will be effected from power shaft 71 through worm 70, worm gear 69, sleeve 66, and the double faced clutch member which, when in the aforesaid position, locks worm 61 to the sleeve 66, and, further, that when the double faced clutch member is disengaged from clutch-half 64 (as in Fig. 6), worm 61, worm gear 60 and the container with its attached parts will remain stationary even though sleeve 66 be rotating.

*Container translating means*

Since the threading cutter which I employ is devoid of pitch it is requisite, in order to form a continuous spiral thread on the work, to effect relative longitudinal movement between the work and the cutter while the work and cutter are rotating relatively to each other, each on its own axis, and to this end I therefore provide means for moving the container with its attached parts, including the work which is operatively locked thereto, for the requisite distance with respect to the cutter. This result I attain through the employment of a master nut and screw and I prefer to make the pitch of the latter, and of course that of the nut as well, greater than the pitch of the thread which is to be formed; thus, for example, if the thread is to be formed with a pitch of ten to the inch I prefer to utilize a master screw having a pitch of one to the inch so that the necessary longitudinal movement of the work with respect to the cutter may be obtained by effecting a relative rotation of the container and master screw (which operate as a unit) on one hand and the nut on the other, through less than a complete revolution. Thus, for example, when forming a ten-pitch thread and utilizing a master screw with a pitch of one to the inch, relative revolution of the screw with respect to the nut amounting to one-tenth of a complete revolution is effective to move the screw and container longitudinally with respect to the nut for one-tenth of an inch which is the amount which the work must be moved longitudinally with respect to the cutter for each complete revolution made by the work in order to produce the desired helical thread. One of the advantages arising from the employment of a master screw and nut having threads of greater pitch than the pitch of the thread to be formed is that errors in the master threads instead of being directly reproduced in the thread on the work are only communicated thereto and reproduced therein in the ratio which the pitch of the latter bears to that of the former, resulting in a decided minimization of error in the finished thread; additionally, as a practical matter it is ordinarily easier to accurately machine a master screw and nut having threads whose convolutions are of relatively great cross sectional area than when the convolutions are finer, as they must be when corresponding directly with those of the thread to be formed, while under operative conditions the large area of contact between the threads of the relatively moving master screw and nut minimizes the wear between the parts. Thus the accuracy of the master threads can ordinarily be made initially greater and can be preserved for a much longer period of time with corresponding resulting accuracy in the threads produced in the work where the pitch of the master thread is made greater than that of the thread to be formed than is the case where the pitch of the master thread is similar to that of the latter.

I therefore, for the purpose of effecting the requisite movement of the container, provide the latter with an annular master thread which is formed on the outer face of a ring 80 surrounding and keyed to the container so as to move therewith, the pitch of this thread being preferably greater than that of the thread which is to be formed, for example, a pitch of one thread to the inch when it is desired to form a thread of ten pitch to the inch on the work. The master screw, which may be either single or multiple and of any cross-sectional form, is cooperative with a correspondingly internally threaded annular nut 81 disposed within the housing and prevented from longitudinal movement by thrust bearings 82 or in any other convenient way. Upon the outer periphery of the nut is formed a worm gear which is at all times in meshing engagement with a worm 83 keyed on the master nut drive shaft 84 which extends in the frame 63 parallel to the container drive shaft 62 and is supported for revolution in suitable bearings mounted in that frame.

Since for the reasons already explained it is necessary while the threading cutter is operating on the work to cause a predetermined longitudinal movement thereof relative to the cutter for each revolution of the work, means are provided by which the master nut will be driven through the worm 83 in correspondence with the rotation of the container but at a somewhat slower rate when a master screw of greater pitch than the thread to be formed is employed, so that the revolving container will be caused to progress gradually with respect to the nut in a longitudinal direction. Thus (Fig. 6) the means for driving the nut while the thread is being formed may comprise a gear 85 mounted on and keyed to shaft 62 and meshing with an idler gear 86 disposed at one end of a sleeve 87 rotatably mounted on a short shaft 88 located between shafts 62 and 84 and supported in suitable bearings, this idler gear in turn meshing with another gear 89 rotatably mounted on shaft 84. Splined to and capable of limited longitudinal movement on shaft 84 adjacent the rear end of gear 89 is an overrunning clutch member 90 having its face provided with clutch teeth cooperative with similar teeth on the face of the gear and so designed that when the gear is driven through gears 85 and 86 from the container drive shaft 62, the respective teeth will engage each other and lock the overrunning clutch member to gear 89, the former being continually pressed toward the gear by a coil spring 91 surrounding the shaft, but when the clutch member is itself driven through shaft 84, as hereinafter described, the teeth of the clutch member will ride over those of the gear. Hence rotation of shaft 62 is communicated to shaft 84 through gears 85, 86, 89 and overrunning clutch member 90 in such manner as to cause the shaft 84 to rotate in the same direction as the former, but the ratio of the gears in the train is so designed as to cause shaft 84 to turn at a slower rate than shaft 62; thus when the master screw is of ten times the pitch of the thread to be formed, the ratio of the gears is such as to turn shaft 84 through nine-tenths of a revolution for each complete revolution of shaft 62 so that for each revolution of the container, which is driven from shaft 62, the master nut, which is driven from shaft 84, will make but nine-tenths of a revolution, in consequence of which the container, during each complete revolution, will move longitudinally of the nut for a distance equal to one-tenth the pitch of the master screw.

It will be readily apparent that by changing the ratio of the train of gears between shafts 62 and 84 the amount of longitudinal progression of the container for each complete revolution thereof may be readily varied so that, without changing the master thread, a thread of different pitch may be produced on the work. Therefore to facilitate the adjustment of the machine for the production of threads of two different pitches I prefer to dispose on shaft 62 a gear 85' and on shaft 84 a gear 89' corresponding respectively to gears 85 and 89 but having a different number of teeth from said gears and to provide on the other end of sleeve 87 an idler gear 86' adapted to connect gears 85' and 89' when disposed between them. Shaft 88 under these conditions may be supplied with spacing collars 93 and 94 located at opposite ends of the sleeve and held in place by set screws, these collars serving to hold the sleeve from longitudinal movement and, when secured in the position shown in Fig. 6, to hold gear 86 in alignment with gears 85 and 89. By providing the wall of the housing with an opening 95 opposite the end of the shaft, it is possible to readily insert a tool in the threaded socket formed in the end of the shaft so as to pull the same out lengthwise and shift gear 86' into alignment with gears 85', 89', thus providing for the driving of shaft 84 through gears 85', 86', 89' instead of 85, 86, 89 with consequent change in the relative speed of rotation of the two shafts and in turn of the container and master nut. When making this change if found desirable spacing collars of suitable length may be substituted for collars 93 or 94 so as to positively restrain the sleeve from any longitudinal movement which might result in the gears getting out of mesh. The opening in the housing may be normally closed by means of a removable cover plate 95'.

*Container returning means*

A machine constructed in accordance with the preferred embodiment of my invention is so arranged that the work will normally be moved to the left when viewed as in Figs. 1, 2 and 4 during the operation of forming the thread when a right hand thread is being produced and in the said figures the parts are shown in the position which they assume when the thread is completed, that is, when the container has moved to the left for the required longitudinal distance to form the thread. It is therefore necessary to provide means for returning the container from such final position to initial or starting position and while such means may be of any convenient form it is, however, extremely desirable that they be of such character as to always return the container to the same point and there bring it to rest, as by so doing the movement which the container undergoes while the thread is being cut will always be initiated from exactly the same point for each successive threading cycle with resulting accuracy and similarity in the threads produced on consecutive pieces of work. For obtaining this result I therefore prefer to employ the means now to be described.

The container returning means therefore are so designed as to impart to the container the requisite forward movement by rotating the nut 81 while the container is prevented from rotation, this rotation of the nut being in the same direction as during the threading operation but preferably at a higher speed so as to provide a quick return. With this end in view a small idler gear 96 is mounted on a stub idler shaft 97 for constant meshing engagement with gear 68; this idler, in turn, meshes with a gear 98 near the forward end of shaft 84 and keyed thereto so that when the double-faced clutch 65 is moved forwardly so as to engage the clutch-half 67 on gear 68, the motion of sleeve 66 will be transmitted through gears 68, 96 and 98 to shaft 84 to cause the same to turn in the same direction in which it turned during the threading operation but, preferably, owing to the ratio of the gear train just referred to, at a somewhat higher speed with consequent rotation of worm 83 and master nut 81. However, as the double-faced clutch member is now out of engagement with the clutch-half 64 through which the drive of the container drive shaft 62 is normally effected, the latter is stationary, thereby, through the intermeshing engagement of worm 61 and worm gear 60, locking the container against rotation, with the result that the rotation of the master nut, which is itself prevented from longitudinal movement, imparts a movement of longitudinal translation to the container so as to move it bodily forward to the position which it initially occupied at the commencement of the threading operation. During this return movement of the container and while the drive of shaft 84 is being effected through gear train 68, 96, 98 the teeth of the overrunning clutch member 90 overrun the teeth on gear 89 which latter is held stationary with shaft 62, spring 91 yielding sufficiently to permit this result.

Figure 6:
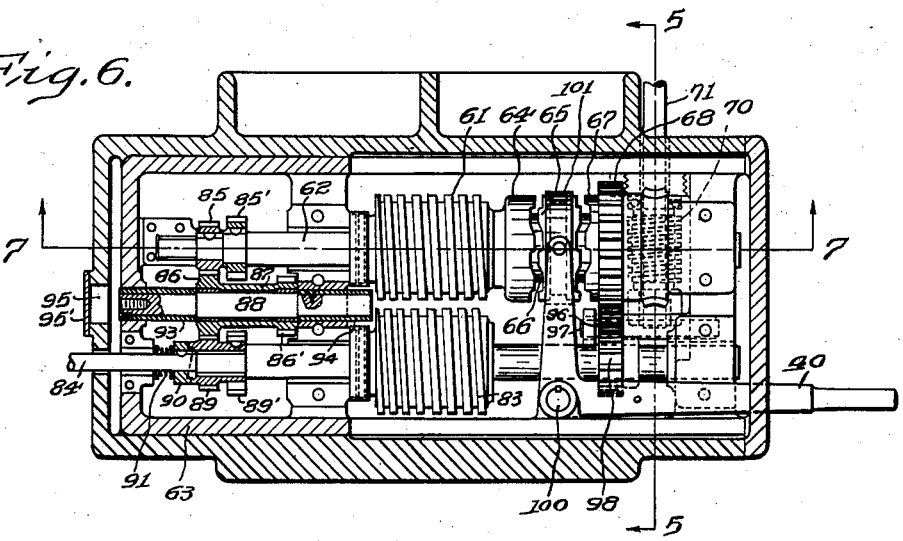
Figure 7:
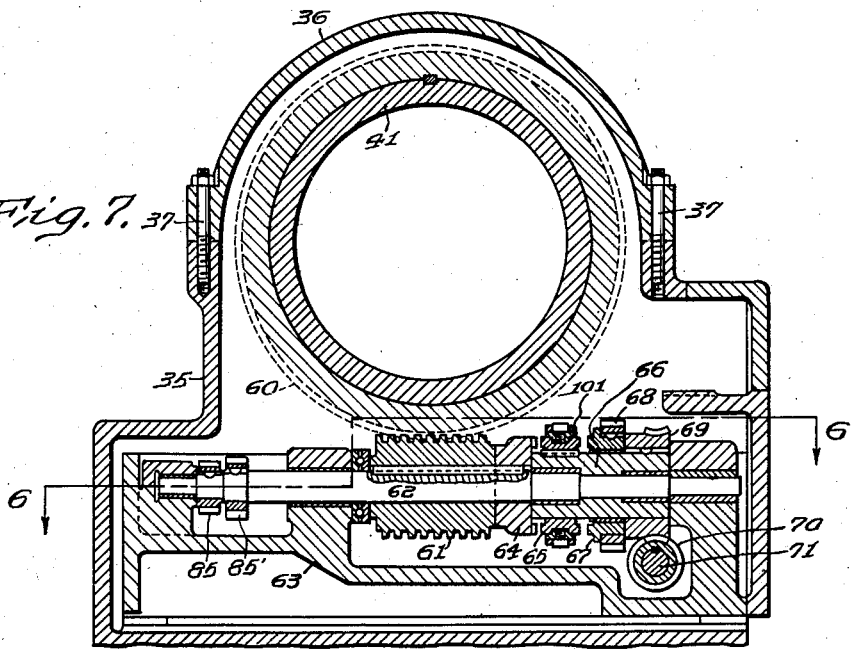

At the commencement of the threading cycle the double-faced clutch member 65 is manually moved into engagement with clutch-half 64 by the operating lever 40, but it is desirable that immediately upon the completion of the threads the clutch member be disengaged automatically from clutch-half 64 and moved into engagement with clutch-half 67 (as in Fig. 9) so as to effect the return of the container to initial position and, when that is accomplished, that the clutch member be moved automatically out of engagement with clutch-half 67 and into a neutral position between the clutch-halves as in Fig. 6 so as to stop the motion of both shafts 62 and 84 at the completion of the threading cycle; the means which I prefer to employ for effecting this automatic movement of the clutch member will now be described.

The lever 40 which is of bell crank form is pivoted to frame 63 at any convenient point upon a vertical pivot 100 and is provided at its inner end with a yoke which is pivoted to a strap 101 passing around the double-faced clutch member in the usual way so that while the member is free to rotate within the strap it may be moved longitudinally in either direction by suitable actuation of the lever. The container 41 is provided with an annular groove 102 in its outer surface in which is disposed a roller 103 pivoted on an arm 104 in turn pivoted at its inner end 105 to a boss 106 on frame 63; thus as the container moves longitudinally in its housing the arm 104 will be moved on its pivot in a horizontal plane and as the roller is set relatively close to the pivotal center of the arm, the relatively small longitudinal movement of the container from initial to final position or vice versa during the threading cycle is operative to swing the outer end of the arm, which is extended from its pivot toward the front of the container housing, for a very much greater distance. This outer or free end of the arm is connected through the medium of a ball and socket joint 107 to a slide 108 which is mounted in a guide 109 carried on a shelf 110 on the wall of the housing, the slide being capable of movement back and forth in a horizontal plane and in a direction at right angles to the axes of shafts 62 and 84 in accordance with the movement of arm 104.

The slide is provided on opposite sides with laterally projecting ears which respectively serve to support an adjustable stop 112 and an adjustable slotted link 113, the stop being adapted to engage one arm of a bell-crank shaped latch 114 when the slide is projected in the direction of the arrow, in Fig. 9, this latch being pivoted to frame 63 at a suitable point and having its other arm provided with a hook or the like adapted to engage a pin or projection 115 on lever 40 when the latter is thrown in the opposite direction so as to engage double-faced clutch member 65 with clutch-half 64, a spring 116 being arranged to continually pull the hooked arm of the latch forwardly so as to bring it into the path of the pin save when forced rearwardly by engagement of the adjustable stop with the other arm of the latch as just described.

The adjustable link 113 is provided with a slot 113' into which is extended a pin 117 carried by the lever so that when the pin is engaged by either end of the slot further movement of the link in one direction or the other is operative to correspondingly move the lever. The lever also carries an adjustable stop 118 adapted to be engaged by the end of slide 108 while a relatively heavy coil spring 119 is disposed between the lever and some suitable point such as frame 63 which is relatively stationary thereto in such manner that the spring will constantly urge the lever in the direction of the arrow in Fig. 9. Preferably this spring is arranged so that its tension may be adjusted.

The operation of the several elements to which reference has just been made is as follows: At the commencement of the threading cycle the container is at the forward or right hand end of its travel when viewed as in Fig. 2 and the double-faced clutch member 65 in a neutral position between the clutch-halves 64 and 67, as in Fig. 6, with the arm 104 also at the limit of its forward travel by reason of its interconnection with the container, pin 117 thus occupying a position near the rear end of slot 113'. To set the machine in operation the lever 40 is manually thrown forward in the direction of the arrow in Fig. 8 so as to compress spring 119 and engage double-faced clutch member 65 with clutch-half 64 as shown in said figure, the lever being thereafter held in such position by the hooked end of the latch 114 engaging over pin 115. As the container moves rearwardly during the threading operation a similar movement is imparted to arm 104, thus moving the slide 108 in the direction of the arrow in Fig. 9 until substantially contemporaneously with the completion of the thread, stop 112 trips latch 114 so as to free the lever which is immediately thrown in a similar direction by spring 119 so as to engage the double-faced clutch member with the clutch-half 67, thus initiating rotation of shaft 84 through gear train 68, 96, 98 and starting the return movement of the container. During this return movement arm 104 is moved about its pivot in the opposite direction, thus correspondingly moving the slide and causing the rear end of link 113 to move toward pin 117 on the lever until the rear end of the link slot contacts with the pin when further movement of the slide is operative to draw the lever in the direction of the arrow in Fig. 8 and thereby move the double-faced clutch member out of engagement with clutch-half 67 and to a neutral position between the clutch-halves, thus bringing the machine to rest.

In case for any reason spring 119 should fail to disengage the double-faced clutch member from clutch-half 64 after latch 114 has been tripped, the container of course will continue to revolve and move rearwardly, thus bringing the end of the slide 108 into contact with adjustable stop 118 following which further movement of the slide is operative to positively free the lever in the direction of the arrow in Fig. 9 for a sufficient distance to disengage the clutch and bring the machine to rest, thereby avoiding the possibility of damage to the mechanism.

*Cutter feeding mechanism*

As hitherto stated, in the operation of the machine two cutters R and T are employed, the first for the purpose of effecting a roughing cut on the end of the work so as to free it from scale and preferably impart to its surface a taper substantially corresponding to that of the threads which are to be formed, and the second for forming the threads proper in the clean and preferably tapered surface exposed by the roughing cut. The roughing cutter may therefore be of any type or form suitable for its intended function, an ordinary tapered milling cutter being preferably employed, while the threading cutter, which is tapered longitudinally in correspondence with the taper of the threads to be cut, is provided with a plurality of teeth having the profile of the desired thread but without pitch; preferably both cutters are substantially the length of or a little longer than the width of the surface to be threaded so that an entire smooth and continuous spiral thread may be formed by effecting substantially a single revolution of the work with respect to each of the cutters while the latter are rotating on their own axes, simultaneously imparting to the work a longitudinal movement of translation equal to the pitch of a single thread and moving the work slightly in a generally radial direction with respect to the threading cutter to compensate for the difference in the radial magnitude of adjacent convolutions of the thread.

The roughing cutter R is mounted at the rear end of the cutter spindle carried by the lower head 4 and the threading cutter T is similarly mounted at the corresponding end of the cutter spindle in the head 5, above the roughing cutter, both cutters thus revolving in a plane normal to the axis of the spindles but the threading cutter lying nearer the front of the machine than the roughing cutter and suitable means including the vertical shaft 12 to which reference has hitherto been briefly made are provided for rotating the cutter spindles from the main drive shaft 15.

When the pipe is being chucked in the machine preparatory to the threading operation it is necessary that both cutters be entirely clear of the end of the pipe and that they be thereafter fed toward the pipe in properly timed sequence so that the roughing cutter will first be fed into depth and operate on the rotating pipe until the roughing cut has progressed sufficiently far around the periphery of the pipe to permit the threading cutter to be fed to depth in the clean metal which has been exposed by the roughing cutter, after which both cutters are operated simultaneously until the roughing cutter has completely traversed the surface of the pipe; thereupon as the roughing cutter has no further useful function to perform it may be moved away from the pipe to assume its initial position while the operation of the threading cutter is continued until the thread is completed, after which it too must be moved to initial position to permit withdrawal of the threaded pipe and the insertion of the subsequent piece.

The several movements of the cutters above referred to are preferably automatically effected by suitable vertical movement of the cutter heads to and from the work in properly timed relation to the rotative and longitudinal movements of the container to which the work is operatively locked, so that the cutters will be respectively brought into and moved out of engagement with the work in properly timed sequence and in such manner as to perform the threading cycle in the shortest possible time with a view to enhancing the productive capacity of the machine. While various means and instrumentalities may be employed for effecting the functions to which reference has just been made, I prefer for that purpose to utilize those now to be described and which are relatively simple and efficient in operation.

Shaft 84 which is continually revolving whenever the container is in motion, is preferably utilized as a source of power for controlling the vertical feed of the heads, and to this end may be extended so as to project through the back of the housing 35 to support a spiral gear 135 which meshes with a corresponding gear on a shaft 136 extending forwardly toward the pillar of the machine, this shaft being provided with universal joints and telescopic sections to compensate for any alteration of the position of the fixture on the bed of the machine. At its forward end adjacent the back of the pillar 2 the shaft is geared by spiral gears 137 to a vertically extending shaft 138 supported in suitable brackets secured to the pillar and terminating at its upper end in a worm 139 in meshing engagement with a worm wheel 140 mounted on a horizontally extending and suitably supported shaft 141. This shaft carries a vertically positioned disk 143 which is provided with two pairs of adjustable contacts 144, 145 hereinafter more particularly described.

The adjusting screws 6 and 7 by which the vertical adjustment of the roughing cutter and threading cutter heads is effected are respectively provided at their upper ends with gears 150, 151. The gear 150 engages a gear 152 disposed on a horizontally extending shaft 153 having its ends journaled in brackets 154, 155 secured to the upper end of the pillar, the shaft extending generally parallel to the front face of the latter. This shaft also carries a worm wheel 156 engaging a worm 157 on a shaft 158 disposed below the shaft 153 and extending at right angles thereto. This shaft is supported in journals 159 mounted on the pillar and at its rear end carries a spur gear 160 engaging a gear 161 on the armature shaft of a small reversible motor 162 mounted on a bracket 163 secured to the pillar. If desired, the worm 157 may be mounted, as shown, between a pair of coil springs 164 so as to minimize the shock on the parts when the motor is reversed and also to some extent effect a slightly yielding or resilient drive of the adjusting screw.

Similar mechanism is employed for effecting the rotation of the adjusting screw 7 comprising a gear 165 engaging the gear 151 on the screw; gear 165 is carried on a shaft 166 corresponding to shaft 153 journaled in brackets 155, 154' and in a similar way supporting a worm wheel 167 engaging a worm 168 on worm shaft 169 mounted in journals 170 and carrying a spur gear 171 engaging another spur gear 172 on the shaft of motor 173 which is similar to the motor 162 and is supported on a bracket 174 on the opposite side of the pillar. It will thus be apparent that each of the adjusting screws is independently driven from its own motor and that the direction of rotation of the screw and in turn the motion of the head which it controls is determined by the direction of rotation of the motor shaft. It will, of course, be further understood that the ratio of the train of gearing connecting each adjusting screw with its motor is so determined that the adjusting screw will be rotated relatively slowly in comparison with the speed of the motor.

The stopping and starting of both motors at the proper times in the threading cycle to effect the requisite motion of the heads is preferably controlled by the adjustable contacts 144, 145 carried by the disk 143 in conjunction with a pair of overload reversing switches S, S' respectively connected to actuate the motors 162 and 173, the contacts being respectively adapted to engage spring contact fingers 178, 179 arranged in their respective paths and conveniently supported on blocks of insulated material 180 disposed on brackets 181, 182 carried by the pillar 2. The contacts 144, 145 are respectively adjustable about the periphery of the disk 143 which latter makes one complete revolution during each threading cycle of the machine so that each of the contacts may be readily set to engage its contact finger at a predetermined time in the threading cycle as hereafter more fully described under the heading "Operation".

The overload reversing switches S, S' are of standard type and hence do not require detailed description, switches of this character being well known and in common use. Each of these switches is so constructed that upon an overload being thrown on the motor which it controls the current flowing to the motor is immediately shut off and the switch automatically thrown so that when the circuit through the switch is re-established the motor will be operated in the opposite direction. It is therefore the function of the contacts 144, 145 and their respective contact fingers 178, 179 to effect this re-establishment of the circuit through the switches at predetermined times in the threading cycle as will hereafter more fully appear. As the wiring necessary for the connection of the switches with their respective motors, the contacts and contact fingers, the power line and the master switch M by which the current may be initially turned on to the switches is necessarily quite complicated and forms no part of the present invention, I have for convenience of illustration shown the switches and wiring in a purely conventional way; it will therefore be understood that the same may be varied to conform with the particular requirements of the type of switches employed, their position with respect to the machine and other like practical considerations. Conventionally, therefore, in Fig. 1, A represents the power line connected with switch S by wires A'. From this switch wires B extend to the motor, a wire C to some part of the machine such as the bracket supporting the shaft on which disk 143 rotates and through which current may flow to the contacts 144, 145 and another wire D to the insulated contact finger 178. In like manner, switch S' is connected to the power line by wires E, with the motor 173 by wires F, with some part of the frame of the machine by wire G and with the insulated contact finger 179 by wire H. A master switch M may be interposed between the switches and the power line. Thus, when either of the contacts 144 engages the finger 178 a circuit will be established through switch S and in a similar way a circuit will be established through switch S' when either contact 145 engages the insulated finger 179.

The extent of vertical movement of the head 4 on its ways is controlled by adjustable stops 185, 186 positioned above and below the head and in a like manner the extent of vertical movement of the head 5 is controlled by similar stops 187, 188 positioned above and below that head as shown in Fig. 1. These stops are of such character that they can be firmly secured in the paths of the adjacent heads so as to positively limit the movement of the latter; thus when either head comes into contact with either of its stops its further movement will be positively arrested and an overload thrown on the motor controlling the adjusting screw by which the movement of the head is effected.

*Cutter arrangement*

It should be noted that the relative arrangment of the cutters and the work is preferably substantially as illustrated in diagrammatic Figs. 11 and 12. Thus when the cutters are in initial position, that is, after the work has been inserted in the machine but before the latter has been set in motion, they occupy with respect to the work P substantially the position shown in dotted lines in Fig. 11, that is, the roughing cutter being below the work but with its axis considerably in front of the axis of the former and the threading cutter being above the center of the work but with its axis even farther in front of the axis of the work than is the axis of the roughing cutter. As both cutters move toward the work vertically, it will thus be apparent that when the roughing cutter is moved upwardly and into depth it will enter the work at a point near the center of the lower forward quadrant of the work, or, in other words, that radius of the work which is normal to the point of tangency of the work and the roughing cutter when the latter is in to operative depth will form an angle with and below the horizontal diameter of the work of about 50°, although this angle will vary somewhat in accordance with the relative diameters of the work and the cutter. It will be additionally apparent that the threading cutter when fed downwardly from its initial position will enter the work in a substantially tangential direction and herein lies an important advantage of the invention, for it has been found in practice it is extremely difficult to consecutively feed a milling cutter radially into a plurality of pieces of work for exactly the same distance each time. Moreover, the error so caused is doubled in the finished piece when the entire surface of the work is traversed by the cutter, as when a thread is being formed, so that, for example, if the cutter is fed in radially for .001" too far the diameter of the finished piece will be .002" too small or, in like manner, .002" too large if the cutter is fed in .001" short of the proper distance. When the work is fed to the cutter or the cutter to the work in a generally tangential as opposed to a radial direction, however, a relatively large error in the length of the feed required to bring the cutter to depth is not transmitted directly to the work with resultant direct diminution of the radius thereof in a corresponding amount but merely appears in the work in a very much smaller amount. Thus, in practice, with my improved machine, assuming that the horizontal distance between the axis of the cutter and the axis of the work is correctly determined and the machine initially set to that distance by means of the housing translating means, a relatively large error, plus or minus, in feeding the threading cutter into depth will not materially affect the diameter of the finished work as the increase or decrease in the length of the radius thereof which results from such an error is extremely small compared with the amount of the error itself.

Operation

The machine being constructed and assembled substantially as hereinbefore described, reference will now be made to its method of operation when utilized for the forming of a tapered thread upon the end of a pipe or tube.

The roughing and threading cutters being positioned on their respective spindles and assuming the container to be at the forward or right hand end of its travel when the machine is viewed as in Fig. 1, the device for affording internal support to the end of the pipe is first inserted and secured in position therein. The end of the pipe is then slid forwardly through the container until it comes into contact with a stop 190 secured to the side of the pillar 2 or in any other convenient position and which is operative to limit the forward movement of the pipe as it is pushed through the container. The pipe is now locked to the container by suitable operation of the chuck and the opposite end of the pipe, which of course is a considerable distance away from the machine when a long length of pipe is being threaded, is supported in any suitable way so that the pipe is free to rotate. By adjustment of the traversing screw 30 the position of the housing may be regulated so as to bring the pipe into proper relation with the cutters in accordance with their relative diameters and the depth of cut to be taken, while by loosening the bolts 23 and sluing the housing as a whole about the pivot pin 29, the axis of the container may be given a slight angular inclination with respect to the axes of the cutters for a purpose more fully explained hereinafter, the exact amount of this inclination depending primarily on the taper of the threads to be formed. Of course after this angular adjustment of the housing is effected, bolts 23 are tightened so as to maintain the housing in its adjusted position.

The adjustable stops 185, 186 may now be adjusted to accord the proper length of travel to the head 4 so that when the head is in contact with stop 186 the roughing cutter will be entirely clear of the pipe and when in contact with stop 185 the roughing cutter will be taking the desired maximum depth of cut in the pipe; the adjustable stops 187, 188 are similarly adjusted so that when the threading cutter head 5 is in contact with the former the threading cutter will be entirely out of engagement with the pipe (as shown in dotted lines in Fig. 11) and when in engagement with stop 188, will be at operative depth in the pipe. The contacts 144, 145 are also adjusted on the disk 143 so that the leading contact 144 (considered with respect to rotation of the disk) will be just about to engage finger 178, while the other contacts will respectively engage the fingers at the proper times in the cycle of operations as will hereinafter more fully appear.

The machine being now in condition for operation and the work in position, power is supplied to the power shaft 15 so as to actuate the latter and set both cutters revolving on their own axes, the master switch M controlling the connection of the switches S, S' with the power line is thrown on and the operating lever 40 moved so as to engage the double-faced clutch member 65 with the clutch-half 64. This movement of the lever is effective to engage the hooked end of latch 114 with the pin 115 so as to hold the lever in the position shown in Fig. 8 and maintain the double-faced clutch member in engagement with the clutch-half 64 and as the container and work start to revolve the disk 143 through its connection with the shaft 84 is also set in motion, thus almost immediately bringing the leading contact 144 into engagement with the finger 178 and energizing the switch S controlling the motor 162. At the termination of the preceding threading cycle switch S, as well as switch S', were left in a condition to respectively operate the motors which they control in a direction to cause the cutters to approach the pipe; consequently as soon as switch S is energized as aforesaid the motor 162 will start to rotate and cause the head 4 to move upwardly so as to bring the roughing cutter from the position shown in dotted lines in Fig. 11 to the position shown in full lines therein and thus enter it in the rotating work. As the stop 185 is so adjusted that when the cutter attains its maximum depth of cut further upward movement of the head will be prevented by its engagement with the stop, an overload is thereby thrown on the motor 162 causing switch S to shut off the current through the motor and also reset itself so that when again energized it will cause the rotation of the motor in the opposite direction. The upward movement of the cutter being thus arrested, the cutter and work now continue their relative rotation until the cutter has traversed a sufficient distance around the work to enable the threading cutter to be brought to operative depth in the clean metal. However, as an appreciable time is required to enable the head 5 to move from initial position in which the cutter is out of engagement with the work as indicated in Fig. 11 to final position in which the cutter is at operative depth in the work (as shown in full lines in Fig. 12), the leading adjustable contact 145 is preferably so set that it will contact with the finger 179 and thus energize switch S' and set the motor 173 into operation to move the head 5 downward as early as possible in the cycle so that the threading cutter will enter the work as near as may be to the forward end of the roughing cut, the object, of course, being to bring the threading cutter to operative depth as promptly as possible. As the adjustable stop 188 is set so that when the threading cutter attains operative depth in the work (which will ordinarily be when the axis of the cutter reaches the horizontal plane passing through the axis of the work) further movement of the head is prevented, an overload is thus thrown on motor 173 when that condition is attained which causes switch S' to interrupt the circuit through the motor and set itself so that when reenergized it will cause the motor to reverse, just as in the case of switch S when head 4 engaged stop 185.

Both cutters being thus brought to operative depth in the work and heads 4 and 5 being held stationary, the relative rotation between the cutters and the work is continued until the roughing cutter has completely traversed the periphery of the work after which it can no longer perform any useful function thereon although the threading cutter has not as yet completed its duty. The roughing cutter may therefore now be moved out of its raised or operative position and returned to its lowered or initial position which result is effected by so setting the second contact 144 on disk 143 when the initial adjustment of the contacts is made, that the contact will engage finger 178 after the roughing cutter has completed its duty so as to reenergize the switch and start motor 162 in reverse direction to thereby lower head 4 until it engages adjustable stop 186 upon attainment of its initial position, thus again throwing an overload on motor 162 and causing switch S to stop the motor and reset itself so that when energized at the beginning of the ensuing cycle on the next piece of work, the motor will operate in a direction to raise the head as heretofore described. In like manner the second contact 145 is initially adjusted on the disk so that after the threading cutter has completely traversed the surface of the work at operative depth, the contact will engage finger 179 and operate switch S' to start motor 173 to raise the head 5 and move the threading cutter upwardly from operative to initial position. Simultaneously with the cutter reaching that position the head 5 engages stop 187, thus overloading motor 173 and actuating switch S' to stop the motor and reset itself for the ensuing cycle.

From the moment when the operating lever 40 is moved to initiate the cycle, the container and work both rotate and move longitudinally with respect to the cutters, this longitudinal movement being effected as already described through the relative revolution of the master nut and container and its extent, from the time when the threading cutter reaches operative depth in the work until the cutter has made a single complete traverse of the surface thereof, being equal to the pitch of the thread which is being cut. However, as the radial magnitude of consecutive portions of a tapered thread gradually increases as the thread proceeds from its smallest to its largest end, it is desirable to insure the production of an absolutely perfect and smooth thread to compensate for this increase, which result is effected in my improved machine by the relative angular disposition of the axes of the threading cutter and the container and work to which reference has hitherto been made and by reason of which a gradual though very slight movement is imparted to the pipe in a direction substantially radial to the axis of the cutter whereby as the pipe rotates and moves longitudinally to the left with respect thereto, when viewed as in Figs. 1 and 2, it is caused to gradually approach the cutter in a substantially radial direction, with the result that adequate compensation is effected for the gradual increase in radial magnitude of the various portions of the thread. It will thus be apparent that in the production of a taper thread by means of my improved machine employing a threading cutter without pitch, the work is given with respect to the cutter a combined rotative, longitudinal and gradual radial movement with resulting production in slightly more than a complete relative revolution between the pipe and threading cutter of a complete, smooth and continuous spiral taper thread slightly greater in length than the overall length of the cutter.

Upon the completion of a single relative revolution between the threading cutter and the pipe after the former has attained operative depth, the thread, as hitherto stated, is completely formed so that the threading cutter may now be moved from operative to initial position and the container also returned to initial position so as to place the machine in condition for the next threading cycle. Theoretically, the threading cutter might be withdrawn after the pipe has made exactly one full revolution with respect to the cutter after the latter has attained operative depth, but in practice it is desirable to give the pipe slightly more than a full revolution with respect thereto in order to prevent any unevenness or inequalities in the thread segments at the points of juncture of those portions of the segments formed by the initial operation of the cutter and those formed by its final operation; revolution of the pipe through an additional arc of 5° to 10° will ordinarily suffice for that purpose. Preferably, therefore, the stop 112 and associated parts are so adjusted that latch 114 will be tripped as the pipe completes this additional rotative movement, thereby causing the spring 119 to move the operating lever in the direction of the arrow in Fig. 9 and engage the double-faced clutch member with the clutch-half 67 to effect the quick return of the container to initial position through the operation of the container returning means hitherto described. During its return movement the container does not revolve but is merely translated longitudinally through the coaction of the master nut and thread, and as the container reaches its initial position the operating lever is again automatically shifted so as to throw the double-faced clutch member to neutral position as shown in Fig. 6, thereby bringing shaft 84 and the mechanism driven therefrom to rest and completing the threading cycle. The work may now be unchucked from the container and withdrawn longitudinally therefrom, the means for affording internal support to the work removed and the machine thus placed in condition for a repetition of the cycle on another piece of work.

It will of course be understood that the setting of the adjustable stops, contacts and other like parts to which I have referred need only be made when the machine is initially adjusted for operation on a given size and character of work and is therefore not repeated before each threading cycle so long as the size of the successive pieces of work is not changed. The machine is thus substantially automatic in character, for once it is adjusted for a given size of work it is only necessary for the operator to insert and chuck the successive pieces in the machine and initiate the threading cycle by moving the operating lever 40; thereafter the requisite movements of the pipe and cutters are effected entirely automatically, the container returned to initial position and the parts, except the drive shaft 15 and the cutters, brought to rest at the completion of the cycle without any attention from the operator whatsoever. Ordinarily the drive shaft and cutters are allowed to revolve between consecutive cycles.

Additionally, since the pipe begins to revolve and the roughing cutter commences its cut considerably in advance of the time when the threading cutter is brought to depth at a point already traversed by the former cutter, it is requisite, in order to permit the action of the threading cutter on the entire surface to be threaded, to impart to the pipe sufficient additional rotation beyond that actually required for the operation of the threading cutter to compensate for the time that the threading cutter is inoperative after the revolution of the pipe begins. The amount of this additional rotation necessarily varies with the relative size and position of the cutters and the work, the rate of vertical movement of the roughing cutter head and other factors but under average conditions it will ordinarily be necessary to rotate the pipe for approximately 90° from the initiation of its rotative movement until the threading cutter reaches operative depth so that the total revolution of the pipe required during the threading cycle to enable both cutters to fully perform their respective functions will approximate some 460° or thereabouts.

While I have herein referred more particularly to the employment of the machine for the production of tapered threads on the ends of long lengths of pipes and tubes, the machine may be employed with equal facility for the production of straight threads by using a straight instead of a tapered cutter and maintaining the container and cutter axes in parallel instead of angular relation, or for numerous other milling operations. Moreover, while I have illustrated in the accompanying drawings and have herein described with considerable particularity one form of machine constructed in accordance with the present invention, it is to be understood that I do not thereby desire or intend to specifically limit myself thereto, for changes and modifications in the design, construction and arrangement of the elements thereof may be made with a view to adapting the machine for use under various operative conditions or with different classes of work or for other reasons as may be desired, without departing from the spirit and scope of the invention as defined in the appended claims.

Having thus described my invention, I claim and desire to protect by Letters Patent of the United States:

1. In a milling machine, a rotatable hollow container adapted to surround the work, means carried by the container for gripping the work, a worm gear carried by the container, a worm cooperative therewith, a power shaft, means for revolving the worm from the power shaft so as to rotate the container, means for disconnecting the worm revolving means from the power shaft, a master thread carried by the container, a nut cooperative with the thread, means interconnected with said worm revolving means for revolving the nut when said container is rotating and in the same direction but at a relatively lower speed, and means operable to revolve the nut from the power shaft at a relatively higher speed but in the same direction independently of the worm revolving means when the worm is stationary and thereby operative to lock the container against rotation.

2. In a milling machine, a rotatable hollow container adapted to surround the work, means carried by the container for gripping the work, means for rotating the container including a worm gear carried by the container and a worm in constant meshing engagement therewith, a power shaft, a clutch adapted to connect the power shaft and the worm so as to rotate the container or to disconnect the shaft from the worm to cause the worm to lock the container against rotation, a master thread carried by the container, a nut cooperative therewith, means interconnected with the worm operative to revolve the nut in the same direction as the container when the latter is rotating, and means for revolving the nut from the power shaft in the same direction but at a higher speed when the container is held stationary by the worm.

3. In a milling machine, a rotatable hollow container adapted to surround the work, means carried by the container for gripping the work, a pair of shafts disposed adjacent the container, gearing interposed between one of said shafts and the container for driving the latter from said shaft, a thread carried by the container, a nut cooperative therewith, gearing interposed between the other shaft and the nut for driving the nut from said shaft, a power shaft, a clutch for selectively connecting the power shaft with the other shafts, means for driving the nut driving shaft from the container driving shaft when the clutch is positioned to connect the latter with the power shaft, and means for driving the nut driving shaft from the power shaft when said clutch is positioned to connect the power shaft therewith.

4. In a milling machine, a rotatable hollow container adapted to surround the work, means carried by the container for gripping the work, a thread carried by the container, a nut cooperative therewith, a container drive shaft, gearing interposed between said shaft and the container for rotating the container when said shaft is revolved, a nut drive shaft, gearing interposed between said shaft and the nut, a power shaft, a clutch operative to selectively engage the power shaft with each of the other shafts, and means interposed between said drive shafts adapted when the container drive shaft is engaged with the power shaft to drive the nut drive shaft from the container shaft and when the nut drive shaft is engaged with the power shaft to permit the container drive shaft to remain idle.

5. In a milling machine, a rotatable hollow container, means for rotating the container, a thread carried by the container, a nut cooperative with the thread, a power source, means for rotating the nut from said source while the container is rotating to cause longitudinal movement of the container in a predetermined direction, means for rotating the nut from the same source when the container is not rotating to move the container in the opposite direction, and means for automatically disengaging the container rotating means from said power source and for engaging said second mentioned nut rotating means therewith after the container has moved for a predetermined distance in a given direction.

6. In a milling machine, a rotatable hollow container, a thread carried thereby, a nut cooperative with the thread and restrained from longitudinal movement, a pair of rotatable shafts respectively interconnected with the container and with the nut, a power shaft, a movable clutch member operative when in one position to connect the power shaft with the shaft which is connected with the container and when in another position to connect the power shaft with the shaft which is connected with the nut, means including an overrunning clutch interposed between the shafts whereby when the movable clutch is in the first mentioned position the shaft which is connected with the nut will be driven from the other shaft and when the clutch is in the second mentioned position the shaft which is connected with the nut will be driven from the power shaft, and means for automatically moving the clutch from one position to the other after the container has revolved for a predetermined time.

7. In a milling machine, a rotatable hollow container, means for rotating the container, a thread carried by the container, a nut cooperative with the thread and restrained from longitudinal movement, means for rotating the nut in the same direction as the container but at a relatively lower rate so as to cause longitudinal movement of the container in a predetermined direction, a power shaft, a movable clutch member adapted when in one position to connect the container rotating means with the power shaft so as to rotate the container and when in another position to disconnect the power shaft from the container rotating means and connect the nut rotating means with the power shaft, means including an overrunning clutch operative to drive the nut rotating means from the container rotating means when the latter are in operation, and automatically actuated means for moving the clutch member from one of its said positions to the other.

8. In a milling machine, a rotatable hollow container, a power shaft, means for rotating the container from said shaft, a thread carried by the container, a nut cooperative with the thread and restrained from longitudinal movement, means for rotating the nut in the same direction as the container but at a relatively lower rate so as to cause longitudinal movement of the container in a predetermined direction, means for driving said nut rotating means through the container rotating means when the latter are operating, means for independently driving the nut rotating means from the power shaft when the container rotating means are not operating to thereby effect movement of the container in the opposite direction, and automatically actuated means for disengaging the container rotating means from the power shaft and engaging the independent nut driving means therewith after the container has moved for therewith after the container has moved for thereby move the container for a similar distance in the opposite direction.

9. In a milling machine, a rotatable hollow container, a power shaft, means for rotating the container from said shaft, a thread carried by the container, a nut cooperative with the thread and restrained from longitudinal movement, means interconnected with the container rotating means for rotating the nut in the same direction as the container while the latter is rotating but at a relatively lower rate to thereby cause progressive longitudinal movement of the container in a predetermined direction, means for driving the nut rotating means from the power shaft at a relatively higher speed and independently of the container rotating means when the latter are not operating, and automatically actuated means for throwing the container rotating means out of operation and the independent nut driving means into operation after the container has revolved for a predetermined time.

10. In a milling machine, a rotatable hollow container, a power shaft, means for rotating the container therefrom, a thread carried by the container, a nut cooperative with the thread and restrained from longitudinal movement, means for rotating the nut in the same direction as the container, means for actuating the nut rotating means through the container rotating means when the latter are operating, means for actuating the nut rotating means from the power shaft at a higher speed and independently of the container rotating means when the latter are not operating, and automatically actuated means for throwing the container rotating means out of operation and the independent nut driving means into operation after the container has revolved for a predetermined time.

In witness whereof, I have hereunto set my hand this 27th day of November, 1926.

GEORGE E. MIRFIELD.